Figure 1:
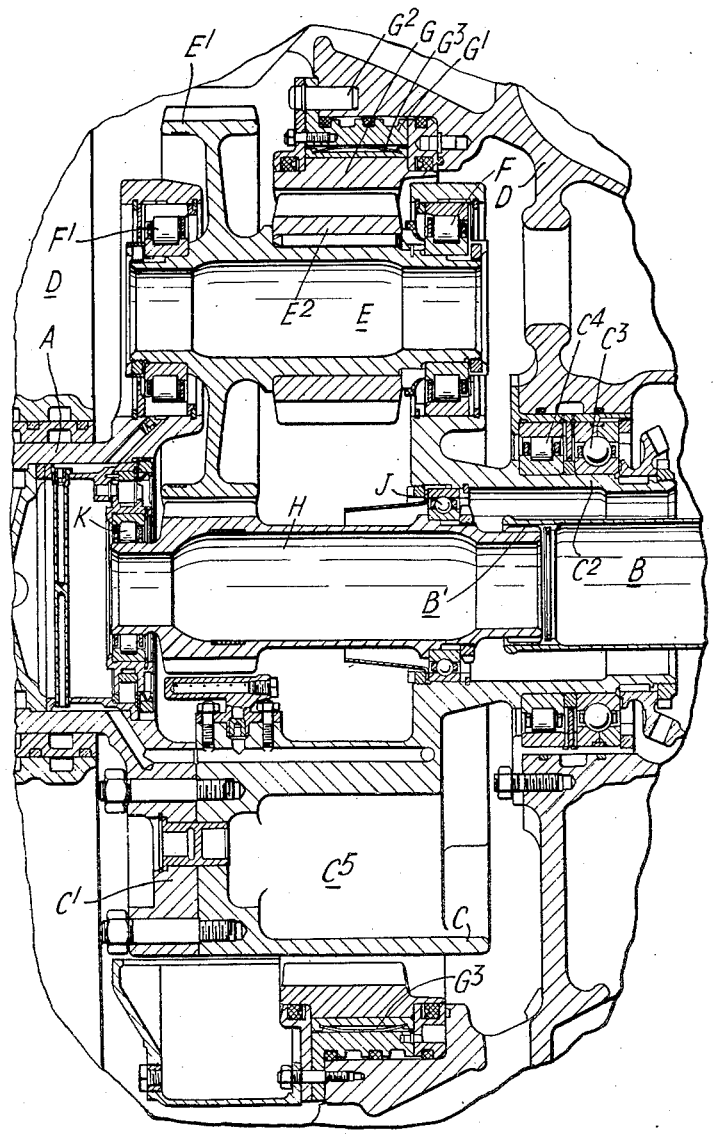

United States Patent Office 2,759,376
Patented Aug. 21, 1956

2,759,376

EPICYCLIC TRANSMISSION GEARING HAVING A FLOATING SUN PINION MOUNTING

Reginald Henry Douglas Chamberlin, Ealing, London, and Michael Joseph French, New Malden, England, assignors to D. Napier & Son Limited, London, England, a British company Application August 10, 1954, Serial No. 448,859

Claims priority, application Great Britain August 17, 1953

6 Claims. (Cl. 74—801)

This invention relates to epicyclic transmission gearing of the kind comprising a spider which is rotatably mounted in bearings so as to have a fixed axis of rotation and carries three or more planet wheel assemblies evenly spaced around its axis of rotation and including planet wheels which mesh with the teeth of a toothed annulus which is held from rotation and with the teeth of a sunwheel which is mounted to rotate so that the sunwheel constitutes the driving member and the spider the driven member of the gearing or vice versa.

In transmission gearing according to the present invention, as in previous transmission gearing of the kind referred to, there will usually be three planet wheel assemblies, but the invention is not limited to arrangements embodying this number of planet wheel assemblies.

The invention is moreover particularly but not exclusively applicable to reduction gearing, in which case it will be understood that the sunwheel constitutes the driving member, and one suitable application is to the reduction gearing between the rotor shaft of a combustion turbine or other prime mover and a propeller for aircraft or marine propulsion.

An object of the invention is to provide an arrangement in which the load due to the torque being transmitted will tend to be evenly distributed between the various planet wheel assemblies.

In epicyclic transmission gearing of the kind referred to according to the present invention the sunwheel is so supported as to have limited movement in all directions normal to its axis of rotation against the action of resilient means.

Usually each planet wheel assembly will include two planet wheels one of which meshes with the toothed annulus and the other with the sunwheel, but in any case the sunwheel will usually conveniently comprise an assembly mounted in two bearings one of which is substantially axially displaced from the plane of the sunwheel and permits no substantial degree of radial movement of the adjacent part of the assembly relatively to the axis of rotation of the spider while the other lies adjacent to the plane of the sunwheel and is resiliently supported so as to permit a limited degree of radial movement of its rotational axis in all directions relatively to the axis of rotation of the spider against the action of resilient means. It will thus be seen that in this arrangement the movement of the axis of the sunwheel assembly against the action of the resilient means is conical. This movement will, however, normally be so relatively small that each of the bearings supporting the sunwheel assembly can be of normal ball or roller type rather than of the self-aligning type, the small necessary movement being allowed for by the normal degree of play in the bearing.

Preferably in transmission gearing according to the invention the toothed annulus is also mounted so as to be capable of limited movement in all directions radial to the axis of rotation of the spider and one particularly suitable application of the invention is to epicyclic transmission gearing including or combined with a torque meter as described in the specification of United States Patent No. 2,715,834.

Figure 2:
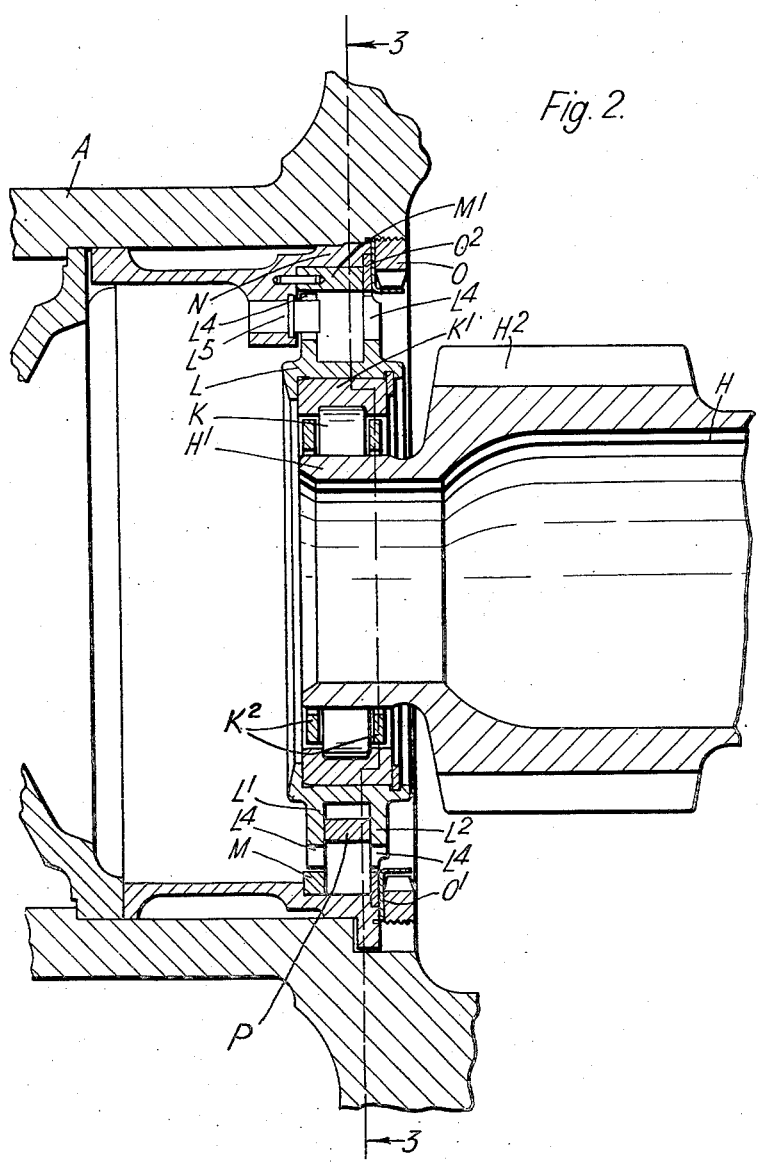
Figure 3:
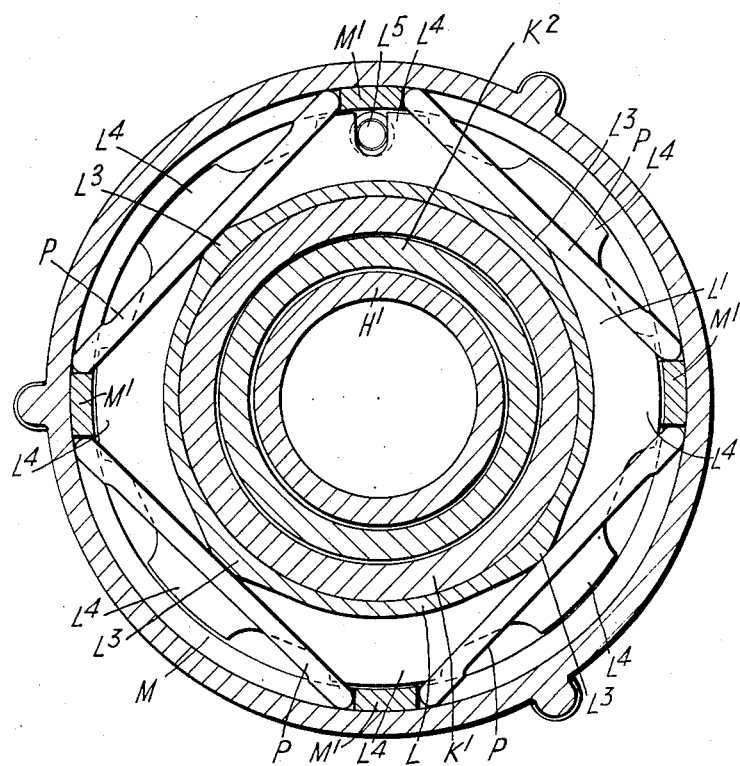

Constructions according to the invention may vary but one construction according to the invention is shown by way of example in the accompanying drawings as applied to the epicyclic reduction gearing between the rotor and the airscrew shaft of an aircraft propulsion unit of which the prime mover is a gas turbine, that is to say a propulsion unit of the kind usually termed a "turboprop." In the drawings:

Figure 1 is a sectional side elevation of the part of the propulsion unit including the reduction gearing, Figure 2 is an enlarged cross sectional side elevation of the mounting of one end of the sunwheel shaft embodied in the construction shown in Figure 1 and Figure 3 is a cross section in the plane 3—3 of Figure 2.

In the construction shown the air-screw shaft of the propulsion unit is indicated at A and is coaxial with the gas turbine rotor shaft which is not shown but which is connected to one end of a quill shaft the other end of which is shown at B, the shafts A and B being connected by epicyclic reduction gearing according to the invention.

The epicyclic reduction gearing comprises a spider formed in two parts C, C¹ of which the part C¹ is formed as a unit with the end of the air-screw shaft A while the other part C is formed with a hub portion or boss C² supported in ball and roller bearings C³, C⁴ in the engine casing D. It will be understood that the air-screw shaft A is supported in bearings in the engine casing D in generally known manner so that the spider C, C¹ is in effect supported at its two ends from the casing D in bearings. The two parts of the spider C, C¹ are rigidly connected to one another by three circumferentially spaced pillar structures one of which is indicated at C⁵ in Figure 1, between which pillar structures lie three circumferentially spaced planet wheel assemblies each comprising a planet wheel shaft E supported at its two ends in bearings F, F¹ respectively in the two parts C, C¹ of the spider and having formed integral with it a relatively large planet wheel E¹ lying adjacent to the forward end of the shaft E and mounted upon it and secured to it, as by keys, a relatively small planet wheel E² lying adjacent to the rear end of the shaft E.

Supported from the casing D around the smaller planet wheels E² is a toothed annulus G which may if desired have associated with it torque measuring apparatus as described in the specification of United States Patent No. 2,715,834 and in any case is arranged so that, while it is held from rotation about the axis of rotation of the spider C, C¹ it is capable of limited radial movement in all directions relatively to that axis while preferably having associated with it springs tending normally to restore it to a position concentric with such axis. To this end in the construction shown the toothed annulus G is connected to a ring G¹ by splines allowing for limited relative radial movement between the annulus G and the ring G¹, the ring G¹ being connected to the casing D by dowels G² while a series of leaf springs G³ is interposed between the annulus G and ring G¹ tending to maintain them concentric.

Thus, in the arrangement shown the toothed annulus G may be connected to the casing D in a manner holding it from rotation about the axis of the spider C, C¹ while being locked by springs indicated at G¹ tending always to maintain it approximately concentric with the axis of the spider C, C¹.

Supported within the spider C, C¹ is a sun wheel assembly comprising a hollow sun wheel shaft H the rear end of which is supported in a ball bearing J within the part C of the spider with the races of this ball bearing rigidly connected respectively to the sunwheel shaft and the spider. The ball bearing J is of the kind permitting limited self-alignment and the front end of the sunwheel shaft H is supported in a roller bearing K, the construction of which with its associated parts is shown enlarged in Figures 2 and 3. The rollers K are themselves located in the usual cage $K^2$. The roller bearing K is resiliently supported in the part $C^1$ of the spider. To this end, while the inner race of the roller bearing K is constituted by a boss $H^1$ on the front end of the sunwheel shaft H, the outer race $K^1$ is rigidly mounted within a supporting ring L having formed on its outer circumference a pair of circumferential flanges $L^1$, $L^2$. Surrounding and spaced from the circumference of the flange $L^1$ is a ring M from which project towards the flange $L^2$ four fingers $M^1$, the ring M being rigidly secured within a housing N which is itself rigidly secured within the part $C^1$ of the spider by a locking ring O having an associated tab washer $O^1$ and plain washer $O^2$, the plain washer $O^2$ surrounding and being spaced from the circumference of the flange $L^2$. It will thus be seen that the ring L, and hence the outer race $K^1$ of the bearing K has limited freedom of radial movement relatively to the spider C, $C^1$ owing to the clearance between the flanges $L^1$, $L^2$ and the ring M. The part of the circumference of the ring L dying between the flanges $L^1$, $L^2$ is provided with four raised portions $L^3$ as shown in Figure 3 and arranged between the flanges $L^1$, $L^2$ so that their ends bear against the fingers $M^1$ while their centre portions bear against the raised portions $L^3$ are four resilient bars P which thus act as leaf springs tending to centralise the ring L within the spider C, $C^1$ while yet permitting the ring L to move radially relatively to the spider to a limited degree. The flanges $L^1$, $L^2$ have radially projecting parts $L^4$ which limit the radial movement of the ring L while rotation of this ring is prevented by a dowel $L^5$.

The sunwheel shaft H is connected to the input shaft B through a loose spline coupling $B^1$, and has formed integral with it a sunwheel $H^2$ which meshes with the larger planet wheels $E^1$ so that power is transmitted from the shaft B through the sunwheel $H^2$ to the planet wheels $E^1$ and hence through the planet wheels $E^2$ which act through the toothed ring G acting as a reaction member to cause rotation of the spider C, $C^1$ and hence the air-screw shaft A at an appropriate speed ratio relatively to the shaft B.

The whole assembly of the epicyclic gearing is conveniently in accordance with the invention forming the subject of United States patent application, Serial No. 384,171, filed October 5, 1953, so as to tend to maintain the teeth of the sunwheel $H^2$ in correct mesh with the teeth of the planet wheels $E^1$ in spite of helical distortion of the sunwheel $H^2$ under load.

It will be apparent that with epicyclic gearing according to the invention constructed as shown in the drawings, both the sunwheel $H^2$ and the toothed annulus G when under load will tend to centralise themselves in relation to the imaginary cylinder on which the axes of the planet wheel shafts E lie, by reason of the equal radial thrusts automatically transmitted to them from the planet wheels and that the resilient mounting of the forward end of the sunwheel shaft H will permit such centralisation during load operation while tending to prevent the sunwheel $H^2$ falling by gravity out of its correct position during operation under light or negligible loads or during periods of load reversal.

What I claim as my invention and desire to secure by Letters Patent is:

1. Epicyclic transmission gearing comprising a spider rotatably mounted in bearings for rotation about a fixed axis, at least three planet wheel assemblies rotatably mounted in the spider and evenly spaced around the axis of rotation of the spider, a toothed annulus which is rotationally stationary and with which the appropriate gear teeth of the planet wheel assemblies mesh, a rotatable sun wheel meshing with the appropriate gear teeth of the planet wheel assemblies, a shaft carrying said sun wheel, a bearing supporting the other end of said shaft, with the sun wheel mounted on the shaft adjacent the second bearing, and a resilient mounting for said second bearing located in said spider, and tending to maintain the sun wheel concentric with the axis of rotation of the spider, while allowing it limited movement in all directions normal to its axis of rotaton.

2. Epicyclic transmission gearing as claimed in claim 1, in which the resilient mounting comprises a plurality of leaf springs lying generally in tangential planes in an annular space surrounding the second bearing.

3. Epicyclic transmission gearing as claimed in claim 2 in which the supporting means for the toothed annulus includes resilient means tending to maintain the toothed annulus concentric with the axis of rotation of the spider.

4. Epicyclic transmission gearing comprising a spider constituting the driven member bearings supporting the spider for rotation about a fixed axis, at least three planet wheel assemblies rotatably carried in the spider and evenly spaced about its axis of rotation, each planet wheel assembly comprising two planet wheels rigidly connected to one another, a toothed annulus held free from rotation and meshing with one of the planet wheels of each planet wheel assembly, a sun wheel meshing with the other planet wheels of each of the planet wheel assemblies, first and second bearings supporting the sun wheel the first bearing being substantially displaced from the plane of the sun wheel and having a substantially fixed rotational axis while the second bearing is disposed adjacent to the sun wheel, and resilient supporting means between the spider and the said second bearing permitting movement of its rotational axis to a limited degree in all directions normal to its rotational axis while tending always to return such axis to coincidence with the axis of rotation of the spider.

5. Epicyclic transmission gearing as claimed in claim 4 including a quill shaft coaxial with and secured to the sun wheel by which power is transmitted to the end of the sun wheel adjacent to the said first bearing.

6. Epicyclic transmission gearing as claimed in claim 4 including supporting means for the toothed annulus comprising radially extending cooperating elements on the annulus and on a fixed member permitting it limited freedom of movement in all directions normal to the axis of rotation of the spider while tending to restore it always to concentricity with the axis of rotation of the spider.

References Cited in the file of this patent

UNITED STATES PATENTS

| | | |
|---|---|---|
| 2,369,422 | Williams | Feb. 13, 1945 |
| 2,583,140 | Else | Jan. 22, 1952 |
| 2,698,526 | Beier | Jan. 4, 1955 |
| 2,715,834 | Chamberlin | Aug. 23, 1955 |

FOREIGN PATENTS

| | | |
|---|---|---|
| 253,321 | Switzerland | Nov. 16, 1948 |
| 349,137 | Great Britain | May 28, 1931 |
| 419,255 | Great Britain | Nov. 8, 1934 |
| 541,820 | Great Britain | Dec. 12, 1941 |
| 609,654 | Germany | Feb. 19, 1935 |
| 630,788 | Great Britain | Oct. 21, 1949 |
| 692,519 | Great Britain | June 10, 1953 |
| 897,500 | Germany | Nov. 23, 1953 |
| 947,804 | France | Feb. 7, 1949 |